United States Patent
Sauvlet

(10) Patent No.: US 11,433,890 B2
(45) Date of Patent: Sep. 6, 2022

(54) METHOD FOR DETECTING A STOP REQUEST DURING AT LEAST PARTIALLY AUTONOMOUS OPERATION OF A VEHICLE

(71) Applicant: Dr. Ing. h.c. F. Porsche Aktiengesellschaft, Stuttgart (DE)

(72) Inventor: Nils Sauvlet, Rutesheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 138 days.

(21) Appl. No.: 16/583,648

(22) Filed: Sep. 26, 2019

(65) Prior Publication Data

US 2020/0122725 A1      Apr. 23, 2020

(30) Foreign Application Priority Data

Oct. 23, 2018    (DE) .................... 102018126403.8

(51) Int. Cl.
| | |
|---|---|
| *B60W 30/18* | (2012.01) |
| *G05D 1/02* | (2020.01) |
| *B60W 30/02* | (2012.01) |
| *G05D 1/00* | (2006.01) |
| *B60W 20/12* | (2016.01) |

(52) U.S. Cl.
CPC .......... *B60W 30/181* (2013.01); *B60W 20/12* (2016.01); *B60W 30/025* (2013.01); *G05D 1/0061* (2013.01); *G05D 1/021* (2013.01); *B60W 2520/04* (2013.01)

(58) Field of Classification Search
CPC combination set(s) only.
See application file for complete search history.

(56) References Cited

U.S. PATENT DOCUMENTS

| | | | |
|---|---|---|---|
| 2003/0210159 A1* | 11/2003 | Arunkumar | G08G 1/0962 340/988 |
| 2011/0238292 A1* | 9/2011 | Bresnahan | G01C 21/3407 701/533 |
| 2014/0129139 A1* | 5/2014 | Ellison | G01C 21/3469 701/533 |
| 2015/0292894 A1* | 10/2015 | Goddard | G01C 21/3453 701/400 |
| 2018/0143027 A1* | 5/2018 | Schlesinger | G06Q 50/30 |
| 2018/0224852 A1* | 8/2018 | Tanahashi | G01C 21/3407 |
| 2018/0281794 A1* | 10/2018 | Ravichandran | B60K 37/06 |
| 2019/0012625 A1* | 1/2019 | Lawrenson | G06Q 50/12 |
| 2019/0061772 A1* | 2/2019 | Prinz | A61B 5/18 |
| 2019/0144000 A1* | 5/2019 | Hennes | B60K 35/00 701/23 |
| 2019/0383628 A1* | 12/2019 | Quint | G01C 21/3453 |
| 2020/0117215 A1* | 4/2020 | Shiga | B60W 60/00253 |

* cited by examiner

*Primary Examiner* — Jeff A Burke
*Assistant Examiner* — Madison B Emmett
(74) *Attorney, Agent, or Firm* — RatnerPrestia

(57) ABSTRACT

A method for detecting a stop request during at least partially autonomous operation of a vehicle, having the following steps of: monitoring a stop request apparatus in the interior of the vehicle; detecting activation of the stop request apparatus; and taking the detected activation of the stop request apparatus into account during autonomous operation of the vehicle by adapting the route guidance.

12 Claims, 3 Drawing Sheets

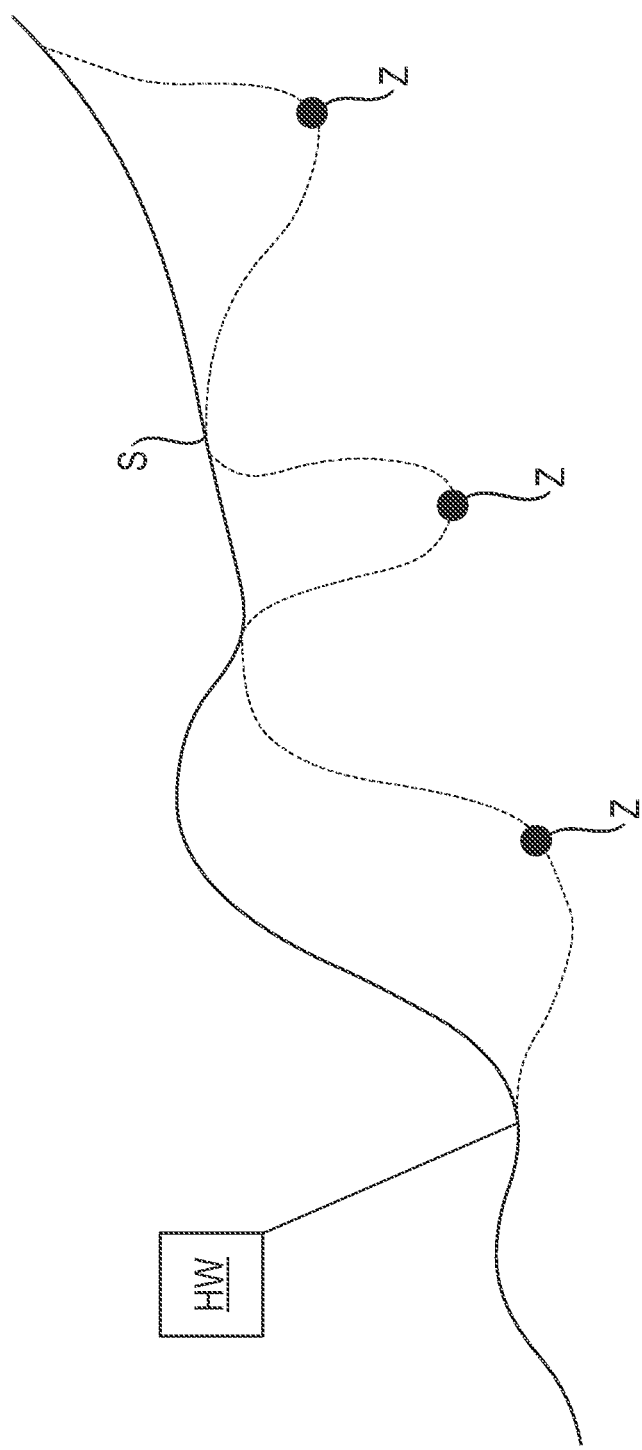

Figure 1:
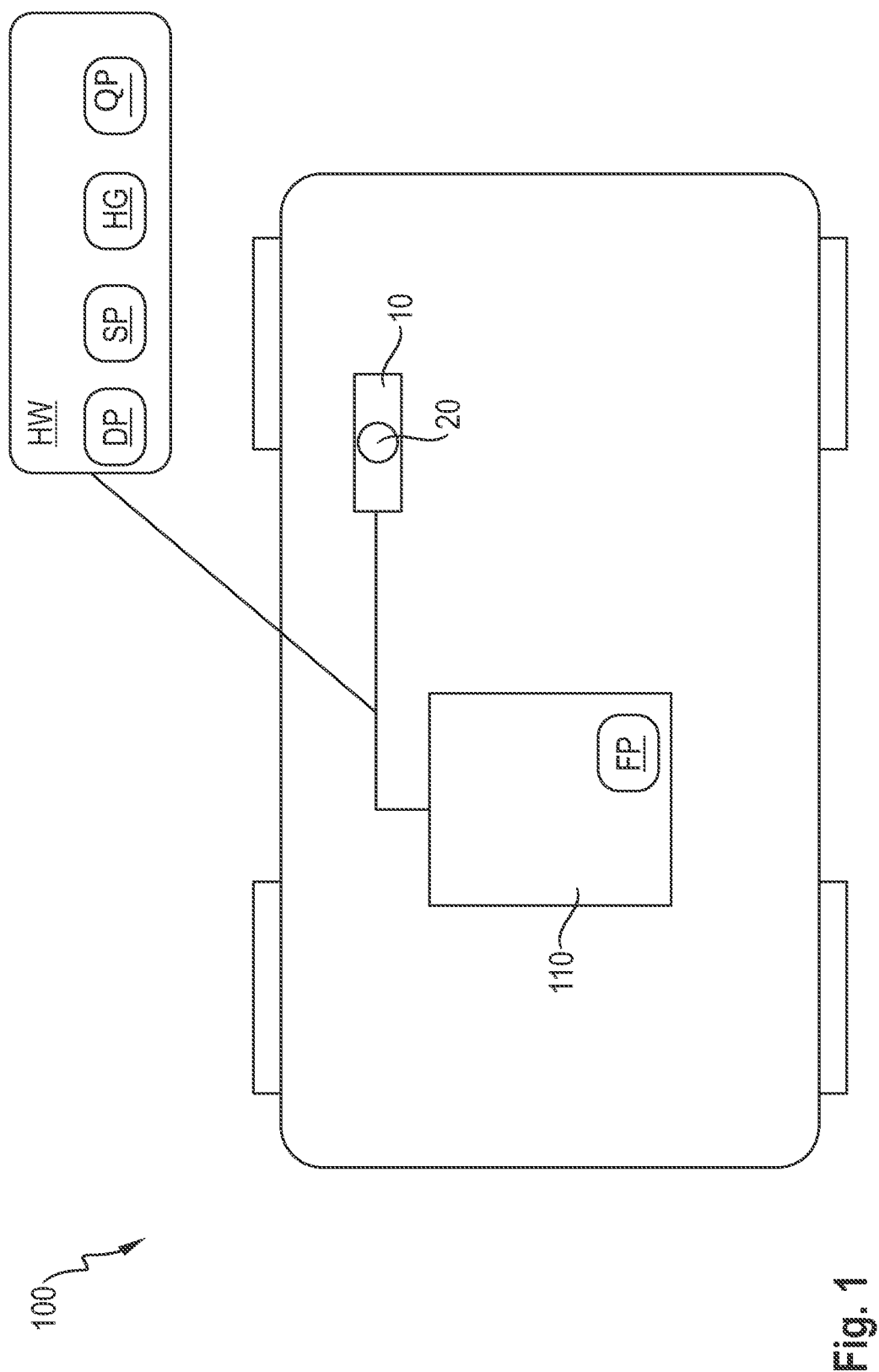

METHOD FOR DETECTING A STOP REQUEST DURING AT LEAST PARTIALLY AUTONOMOUS OPERATION OF A VEHICLE

CROSS-REFERENCE TO RELATED APPLICATION

This application claims priority to German Patent Application No. 10 2018 126 403.8, filed Oct. 23, 2018, the content of such application being incorporated by reference herein in its entirety.

FIELD OF THE INVENTION

The present invention relates to a method for detecting a stop request during at least partially autonomous operation of a vehicle and to a stop request apparatus for detecting such a stop request.

BACKGROUND OF THE INVENTION

It is known that vehicles can be operated in an autonomous or partially autonomous manner in different degrees. Depending on the degree of autonomization of operation, this results in the occupants of the vehicle no longer having to actively attend to the control of the operation of the vehicle. For example, the occupants can read, can engage with mobile telephones or can even sleep. The vehicle is operated by an operating apparatus which controls the vehicle or completely controls the vehicle and performs the route guidance with a defined destination of the route guidance. Steering, acceleration, braking and similar modes of operation of the vehicle are carried out in an autonomous or at least partially autonomous manner.

The disadvantage of the known solutions during partially automated operation of the vehicle is, inter alia, the consideration of a stop request from the occupants. In the previous solution, the occupants have to actively and manually change the route guidance which is a main basis for the autonomous operation of the vehicle. This is inconvenient and in some cases is even possible only with difficulty or is not possible at all. If, for example, the vehicle driver who has control of the operating apparatus of the vehicle is sleeping or is not available, a stop request from the further occupants, for example the occupants in the back of the vehicle, cannot be manually incorporated in the route guidance or can be incorporated only by disturbing the vehicle driver. This reduces the comfort and furthermore also the detection speed for implementing the stop request.

SUMMARY OF THE INVENTION

One non-limiting aim of the present invention is to improve the comfort in a cost-effective and simple manner when considering the stop request and to integrate this, in particular, in the autonomous operation of a vehicle.

Features and details described in connection with the method according to aspects of the invention also apply in connection with the stop request apparatus according to aspects of the invention and vice versa in each case, with the result that reference is always made or can always be made to the individual aspects of the invention reciprocally with regard to the disclosure.

According to aspects of the invention, the method is used to detect a stop request during at least partially autonomous operation of a vehicle. Such a method has the following steps of:

monitoring a stop request apparatus in the interior of the vehicle, detecting activation of the stop request apparatus, taking the detected activation of the stop request apparatus into account during autonomous operation of the vehicle by adapting the route guidance.

In contrast to known solutions, the detection of a stop request is decoupled from the vehicle driver of the vehicle and is directly integrated in the autonomous operation of the vehicle in a method according to aspects of the invention. In order to be able to ensure this, substantially two steps are required. On the one hand, an available stop request apparatus which is situated in the interior of the vehicle must be able to be monitored. As also explained later, such a stop request apparatus may have an activation means, for example. It therefore becomes possible for the occupants of the vehicle to express a stop request and to communicate it to the operating apparatus of the vehicle. The stop request apparatus is therefore, as it were, the interface between the occupants and the operating apparatus with respect to an expression of a stop request. In a second step according to aspects of the invention, this stop request is taken into account after detecting the activation of the stop request apparatus. The activated stop request apparatus is taken into account by adapting the route guidance. As also explained later, a stop request may have different reasons. In this case, the different reasons may result in different adaptation of the route guidance.

In principle, an autonomously operated vehicle should be operated with high safety relevance. This means that a standstill or deceleration to a standstill is possible for the vehicle only when permitted by the external environment. In addition to an emergency braking situation, planned stops for such a stop request are also a standstill situation which must be possible. In order to ensure this, a stop request can therefore now adapt the route guidance to the effect that, at the next possible time corresponding to the stop request reason, an intermediate destination which is integrated in the route guidance is approached. The type, the location, the distance or other parameters of this intermediate destination may likewise be taken into account in this case, with the result that different intermediate destinations for different stop requests accordingly also result in different adaptation of the route guidance. This intermediate destination can therefore also be understood as a stop.

It goes without saying that it is also conceivable for not only a single stop request to be considered and taken into account, but rather for a plurality of stop requests to be considered and taken into account in combination. In this case, optimization methods can be used to optimize the individual stop requests and/or different parameters of one or more stop requests, to combine them and to improve them with respect to the corresponding optimization parameter. Optimization with regard to the route loss, the time loss or the quality gain for the corresponding intermediate destination is mentioned at this point. The stop request may therefore have further details for enabling such optimization.

Advantages may be achieved if, in a method according to aspects of the invention, the stop request has a stop reason which is taken into account with an appropriate intermediate destination in the route guidance. Such a stop reason may be, for example, the need to search for a toilet, the need to eat food, the need to sleep, the need to smoke or the purchase of food or cigarettes. Combined stop reasons are also conceivable within the scope of the present invention. In order to choose an intermediate destination appropriate for this stop reason and to take it into account in the route guidance, the operating apparatus can carry out a comparison with corresponding data. These data may be stored in corresponding lists and tables in the vehicle, for example. However, a comparison is preferably carried out with data outside the vehicle, for example on the Internet or in cloud data storage. Intermediate destinations can therefore be ideally adapted to the respective stop reason in a specific manner and/or even in a manner personalized to the respective occupants.

Further advantages are achieved if the stop request has an urgency parameter in a method according to aspects of the invention. Such an urgency parameter can also be referred to as a prioritization parameter which prioritizes the time of the event of the intermediate destination. The more urgent the stop request, the less other parameters of the stop reason are taken into account. If, for example, there is great urgency to visit a toilet, this intermediate destination is approached with the shortest possible time delay. This also applies when other parameters would consider a combination, for example with a fuel stop, to be useful. It goes without saying that this urgency parameter can also be weighted or matched with other parameters.

It is likewise advantageous if the stop request has a route deviation parameter in a method according to aspects of the invention. In other words, it is possible to define here a maximum route loss and/or a maximum time loss which is/are taken into account when selecting the intermediate destination. This results in intermediate destinations which are too far away no longer being taken into account or no longer being approached. Decisive advantages can be achieved here with regard to the optimization of the selection of the intermediate destination.

Another advantage can be achieved if the stop request has a quality parameter in a method according to aspects of the invention. A quality parameter can be understood as meaning quality specifications or comparisons with corresponding ratings from the data from a cloud, from the Internet or from data stored in the vehicle. Own favorites may also represent corresponding quality parameters. In this case too, it should be pointed out that such a quality parameter can naturally be combined with all or individual further parameters described. A quality parameter may pay attention to accordingly high ratings of the restaurant, for example when choosing a meal break, with the result that only highly rated restaurants and accordingly restaurants with a good rating are possible as an intermediate stop for the meal break as a stop request and are taken into account when adapting the route guidance.

Further advantages can be achieved if, in a method according to aspects of the invention, the route guidance is adapted only after approval by the vehicle driver. Such approval is normally based on a notification from the vehicle driver. In particular, when other occupants of the vehicle are children or minors, the final authority for approving the stop request for taking into account the route guidance can still be given by the vehicle driver himself in this manner. However, in order to nevertheless be able to comply with the stop request in the case of a distracted vehicle driver or a sleeping vehicle driver, it may be advantageous to adapt the route guidance even without approval after a corresponding waiting time. In such a case, the vehicle driver would therefore have to actively reject the stop request within the waiting time.

Advantages are also achieved if, in a method according to aspects of the invention, at least one vehicle parameter is taken into account when adapting the route guidance. A vehicle parameter may be, for example, the state of charge of a battery apparatus, the filling level of a tank or a maintenance condition of individual components of the vehicle. For example, the stop request may be combined with a corresponding charging stop of the vehicle and/or a fuel stop of the vehicle in order to reduce the total time of the journey. This should be correlated, in particular, with a corresponding urgency parameter, as has already been explained. The total number of stops from the route guidance or the total number of intermediate destinations can therefore preferably be reduced and the total journey time can thus be optimized.

The present invention also relates to a stop request apparatus for detecting a stop request during at least partially autonomous operation of a vehicle. Such a stop request apparatus has at least one activation means which is arranged in the interior of the vehicle and is connected, for communicating signals, to an operating apparatus of the vehicle for the purpose of detecting the activation of the stop request apparatus. A stop request apparatus according to aspects of the invention therefore entails the same advantages as have been explained in detail with respect to a method according to aspects of the invention.

A stop request apparatus according to aspects of the invention can be developed to the effect that the at least one activation means can be activated by all or substantially all occupants in the interior of the vehicle. Two or more activation means for the different occupants can thus also be provided. This applies, in particular, to occupants in the back on the rear seats of the vehicle who do not have any access to a corresponding operating unit of the operating apparatus of the vehicle.

It is likewise advantageous if, in a stop request apparatus according to aspects of the invention, the at least one activation means is designed to input at least one further parameter, in particular one of the following parameters:

stop reason
urgency parameter
route deviation parameter
quality parameter.

The list above is a non-exhaustive list. The corresponding selection can be provided, for example, by a menu field which is displayed on a display unit or is represented by an actual menu field. Pressing means or rotating means or the combination of different means can be used as activation means for selection.

BRIEF DESCRIPTION OF THE DRAWING FIGURES

Figure 2:
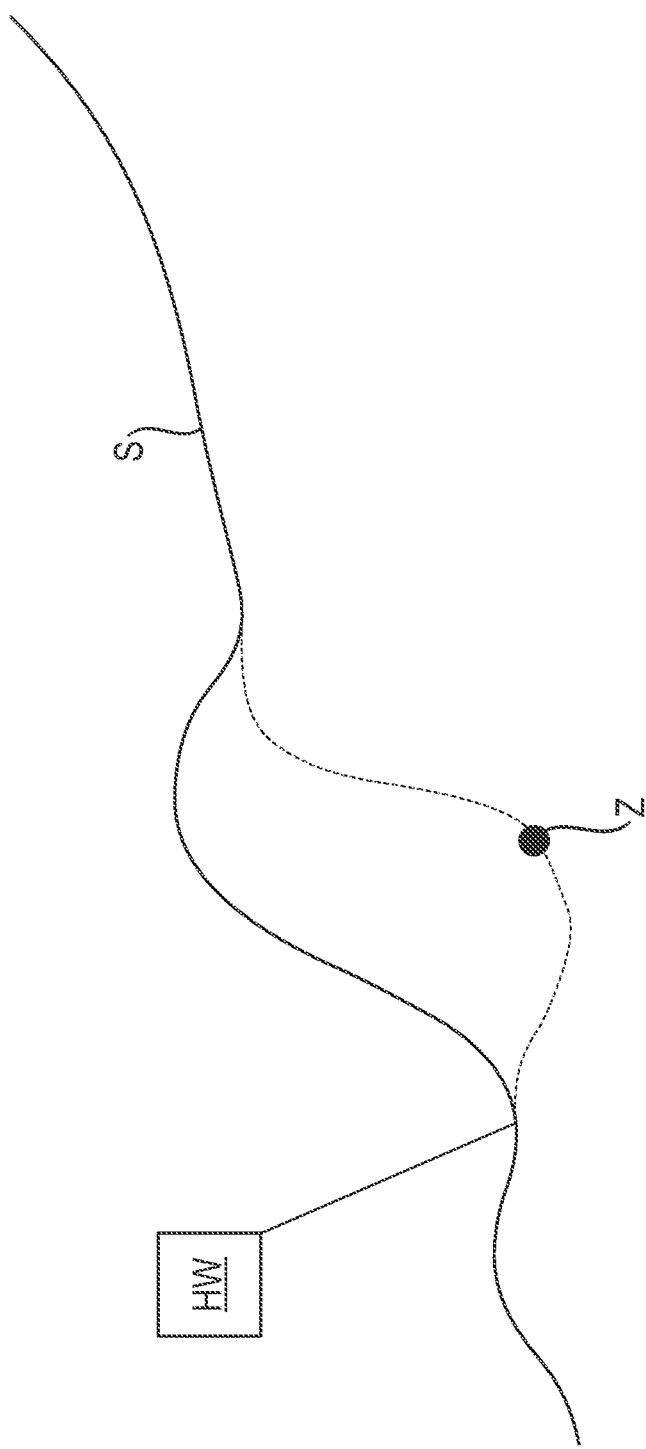

Further advantages, features and details of the invention emerge from the following description which describes exemplary embodiments of the invention in detail with reference to the drawings. In this case, the features mentioned in the claims and in the description can each be essential to the invention individually or in any desired combination. In the drawings:

FIG. 1 schematically shows a vehicle having a stop request apparatus according to aspects of the invention, FIG. 2 schematically shows the adaptation of route guidance according to a first example, and FIG. 3 schematically shows the possible adaptations of the route guidance according to a second example.

DETAILED DESCRIPTION OF THE INVENTION

FIG. 1 schematically shows how a vehicle 100 can be constructed. Such a vehicle 100 is equipped here with an operating apparatus 110. This operating apparatus 110 is designed for autonomous and/or partially autonomous operation of the vehicle 100. Within the scope of the present invention, this comprises the autonomous operation of the steering, the acceleration and the braking of the vehicle 100. These three basic modes of operation of the vehicle 100 are based on route guidance, that is to say a starting point and a destination to be reached. In this case, the occupants of the vehicle 100 may remain passive and may completely surrender control to the operating apparatus 110.

If one of the occupants of the vehicle 100 wishes to stop, this stop request can be communicated to the operating apparatus 110 via the stop request apparatus 10. An activation means 20 or a plurality of activation means 20 is/are provided for this purpose and may be in the form of a pushbutton or a rotating selection button or else in the form of a display operating panel with a touchscreen. The occupants therefore forward the stop request HW to the operating apparatus 110, with the result that this stop request HW can be taken into account in the route guidance S according to FIGS. 2 and 3. In this case, the stop request HW may have a stop reason HG and further parameters such as an urgency parameter DP, a route deviation parameter SP and/or a quality parameter QP. A vehicle parameter FP of the operating apparatus 110 can also be additionally taken into account when adapting the route guidance S.

FIG. 2 shows a simple solution of a method according to aspects of the invention. At the time of the detected stop request HW, illustrated using the dashed line, the route guidance S is adapted and changed, with the result that an intermediate destination Z is reached. The vehicle 100 stops at the intermediate destination Z in order to perform the stop reason, HG, which was the basis of the stop request HW.

FIG. 3 shows a somewhat more complex situation in which three different intermediate destinations would be available for complying with the stop reason HG at the time of the stop request HW. The three intermediate destinations Z differ in terms of fundamental criteria which can now be selected by the operating apparatus 110 on the basis of the given prioritization. The middle intermediate destination Z has the lowest route deviation with regard to the distance to the route guidance S. The left-hand first intermediate destination Z can be reached most quickly on the basis of an urgency parameter DP, and the right-hand intermediate destination Z can take into account high quality criteria of a quality parameter QP, for example with a good rating. In this case, the corresponding prioritization is preferably concomitantly given directly by the user or occupants of the vehicle 100 as part of the stop request HW.

The preceding explanation of the embodiments describes the present invention only within the scope of examples. It goes without saying that individual features of the embodiments can be freely combined with one another, if technically useful, without departing from the scope of the present invention.

What is claimed is:

1. A method for operating a vehicle during at least partially autonomous operation of the vehicle following a route guidance (S), comprising:
   monitoring a stop request apparatus in an interior of the vehicle,
   detecting activation of the stop request apparatus by a passenger or operator of the vehicle,
   receiving from the stop request apparatus multiple stop requests during a single trip and a stop reason associated with each stop request, wherein the stop reasons are selected by the passenger or operator of the vehicle from a list comprising at least toilet and food,
   optimizing the multiple stop requests by (i) accounting for a route deviation parameter, a destination quality parameter, a vehicle parameter and an urgency parameter that are each associated with the stop reason of each stop request, (ii) for each stop request, weighting said parameters associated with the stop reason relative to each other and the urgency parameter, and (iii) prioritizing the multiple stop requests based upon the weighted parameters for the stop reasons,
   selecting intermediate destinations (Z) based upon the optimization of the multiple stop requests;
   changing the route guidance (S) to include the intermediate destinations (Z); and
   stopping the vehicle at the intermediate destinations (Z) based upon the changed route guidance (S).

2. The method as claimed in claim 1, wherein the route guidance (S) is changed only after approval by a driver of the vehicle of a request to change the route guidance (S).

3. The method as claimed in claim 1, wherein the destination quality parameter is a restaurant rating.

4. The method as claimed in claim 1, wherein, after receiving a request to change the route guidance (S), the route guidance (S) is automatically changed if the driver does not respond within a predetermined amount of time to the request to change the route guidance (S).

5. The method as claimed in claim 1, wherein the at least one vehicle parameter is a state of charge of a battery of the vehicle.

6. The method as claimed in claim 1, wherein when the stop reason selected by the passenger or operator of the vehicle is food, the vehicle or the stop request apparatus selects an intermediate destination (Z) for food based upon a route deviation to the intermediate destination (Z) for food, a state of charge of a battery of the vehicle, and a restaurant quality rating.

7. A stop request apparatus for managing stop requests during at least partially autonomous operation of a vehicle following a route guidance (S), said stop request apparatus comprising:
   at least one activation means which is arranged in an interior of the vehicle and is connected, for communicating signals, to an operating apparatus of the vehicle for the purpose of detecting an activation of the stop request apparatus,
   wherein the stop request apparatus is configured to receive multiple stop requests during a single trip and a stop reason associated with each stop request, wherein the stop reasons are selected by the passenger or operator of the vehicle from a list comprising at least toilet and food,
   wherein the stop request apparatus is configured to optimize the multiple stop requests by (i) accounting for a route deviation parameter, a destination quality parameter, a vehicle parameter and an urgency parameter that are each associated with the stop reason of each stop request, (ii) for each stop request, weighting said parameters associated with the stop reason relative to each other and the urgency parameter, and (iii) prioritizing the multiple stop requests based upon the weighted parameters for the stop reasons,
   wherein the stop request apparatus is further configured to select intermediate destinations (Z) based upon the optimization of the multiple stop requests; and wherein the stop request apparatus is configured to change the route guidance (S) to include the intermediate destinations (Z).

8. The stop request apparatus as claimed in claim 7, wherein the at least one activation means is configured to be activated by all or substantially all occupants in the interior of the vehicle.

9. The stop request apparatus as claimed in claim 7, wherein the destination quality parameter is a restaurant rating.

10. The stop request apparatus as claimed in claim 7, wherein the vehicle parameter is a state of charge of a battery of the vehicle.

11. A vehicle comprising the stop request apparatus of claim 7.

12. The stop request apparatus as claimed in claim 7, wherein when the stop reason selected by the passenger or operator of the vehicle is food, the stop request apparatus selects an intermediate destination (Z) for food based upon a route deviation to the intermediate destination (Z) for food, a state of charge of a battery of the vehicle, and a restaurant quality rating.

* * * * *